United States Patent
Heise

(10) Patent No.: US 8,553,721 B2
(45) Date of Patent: Oct. 8, 2013

(54) CHANNEL BONDING AND PACKET FRAGMENT RETRANSMISSION METHOD AND APPARATUS

(75) Inventor: Bernd Heise, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 359 days.

(21) Appl. No.: 12/196,561

(22) Filed: Aug. 22, 2008

(65) Prior Publication Data

US 2010/0046549 A1 Feb. 25, 2010

(51) Int. Cl.
*H04J 3/24* (2006.01)

(52) U.S. Cl.
USPC ............................................. 370/474

(58) Field of Classification Search
USPC ......... 370/229–230, 392, 342, 474, 394, 352, 370/347, 465, 389
See application file for complete search history.

(56) References Cited

U.S. PATENT DOCUMENTS

| | | | |
|---|---|---|---|
| 6,894,976 B1* | 5/2005 | Banga et al. | 370/235 |
| 7,593,380 B1* | 9/2009 | Ferguson et al. | 370/342 |
| 2003/0108066 A1* | 6/2003 | Trippe | 370/474 |
| 2004/0062198 A1* | 4/2004 | Pedersen et al. | 370/229 |
| 2004/0213214 A1* | 10/2004 | Jung et al. | 370/352 |
| 2006/0039379 A1* | 2/2006 | Abe et al. | 370/394 |
| 2006/0104279 A1* | 5/2006 | Fellman et al. | 370/392 |
| 2006/0187834 A1* | 8/2006 | Nichols et al. | 370/230 |
| 2007/0025321 A1* | 2/2007 | Padovani et al. | 370/347 |
| 2007/0127467 A1* | 6/2007 | Yi | 370/389 |
| 2008/0037588 A1* | 2/2008 | Yi | 370/474 |
| 2009/0086759 A1 | 4/2009 | Heise et al. | |
| 2009/0089638 A1 | 4/2009 | Heise et al. | |
| 2010/0042883 A1 | 2/2010 | Heise | |
| 2010/0046542 A1* | 2/2010 | van Zelst et al. | 370/465 |

OTHER PUBLICATIONS

Bees, D. "Flexible Bandwidth Services with DSL Bonding." Technology White Paper, PMC-Sierra, Inc., Issue 1, Aug. 2002 (PMC-2021395).
International Telecommunication Union. ITU-T G.998.1. "Series G: Transmission Systems and Media, Digital Systems and Networks | Digital Sections and Digital Line System—Access Networks | ATM-Based Multi-Pair Bonding." Jan. 2005.
International Telecommunication Union. ITU-T G.998.2. "Series G: Transmission Systems and Media, Digital Systems and Networks | Digital Sections and Digital Line System—Access Networks | Ethernet-Based Multi-Pair Bonding." Jan. 2005.

* cited by examiner

*Primary Examiner* — Kwang B Yao
*Assistant Examiner* — Syed M Bokhari
(74) *Attorney, Agent, or Firm* — Murphy, Bilak & Homiller, PLLC

(57) ABSTRACT

According to one embodiment, a physical line receiver is coupled to at least one of a plurality of bonded communication lines over which a sequence of packet fragments are transmitted as data units. The physical line receiver includes at least one physical sublayer that transfers packet fragments recovered from different ones of the data units received by the physical line receiver to a bonding sublayer for packet reassembly until the physical line receiver is instructed to stop transferring packet fragments because of a transmission error on one or more of the bonded communication lines coupled to a different physical line receiver. The at least one physical sublayer also buffers the recovered packet fragments without transferring the buffered packet fragments to the bonding sublayer until the physical line receiver is instructed to resume transferring packet fragments to the bonding sublayer.

25 Claims, 4 Drawing Sheets

CHANNEL BONDING AND PACKET FRAGMENT RETRANSMISSION METHOD AND APPARATUS

BACKGROUND

Bandwidth in wireline communication systems such as those based on the T1/E1 and DSL data transmission technologies can be increased by bonding (i.e. aggregating) several physical communication lines together to form a single logical link having a higher combined bandwidth. A bonding group includes a bidirectional data stream transported by multiple bidirectional bearers across multiple physical media in both upstream and downstream directions, e.g., between CPE (customer premise equipment) and CO (central office) entities.

On the transmitter side, outgoing data packets are disassembled into fragments and spread over a plurality of communication lines using a bonding protocol (e.g. a round robin method). For example, one packet fragment can be assigned to a first bonding line, a second fragment to a different line and so on. The packet fragments are transmitted over the bonding lines in a particular sequence. The receiver monitors the bonding lines for newly transmitted packet fragments and reassembles the packet data from recovered packet fragments. A sequence ID (SID) is included with each transmitted packet fragment to indicate the order in which the different fragments occur within a packet so that the packet can be properly reassembled.

However, not all packet fragments are transmitted without error. For example, noise or interference can cause data transmission errors on one or more of the bonded communication lines. The receiver requests retransmission of each erroneous packet fragment via the bonding line that caused the transmission error. Packet fragments continue to arrive on the bonding lines not affected by the transmission error. These valid packet fragments are recovered and used for packet reassembly. Care must be taken by the receiver to not process packet fragments out of order while waiting for retransmission of older packet fragments. Also, only a small amount of buffer capacity is typically available to support bonding and packet reassembly functions at the receiver. The bonding and packet reassembly buffer at the receiver can quickly overflow while the receiver waits for retransmission of older packet fragments. In each case, packet data can be lost or corrupted when data transmissions errors occur in a wireline communication system that employs both packet fragment retransmission and channel bonding.

SUMMARY

According to one embodiment, a physical line receiver is coupled to at least one of a plurality of bonded communication lines over which a sequence of packet fragments are transmitted as data units. The physical line receiver includes at least one physical sublayer that transfers packet fragments recovered from different ones of the data units received by the physical line receiver to a bonding sublayer for packet reassembly until the physical line receiver is instructed to stop transferring packet fragments because of a transmission error on one or more of the bonded communication lines coupled to a different physical line receiver. The at least one physical sublayer also buffers the recovered packet fragments without transferring the buffered packet fragments to the bonding sublayer until the physical line receiver is instructed to resume transferring packet fragments to the bonding sublayer.

Those skilled in the art will recognize additional features and advantages upon reading the following detailed description, and upon viewing the accompanying drawings.

DETAILED DESCRIPTION

Figure 1:
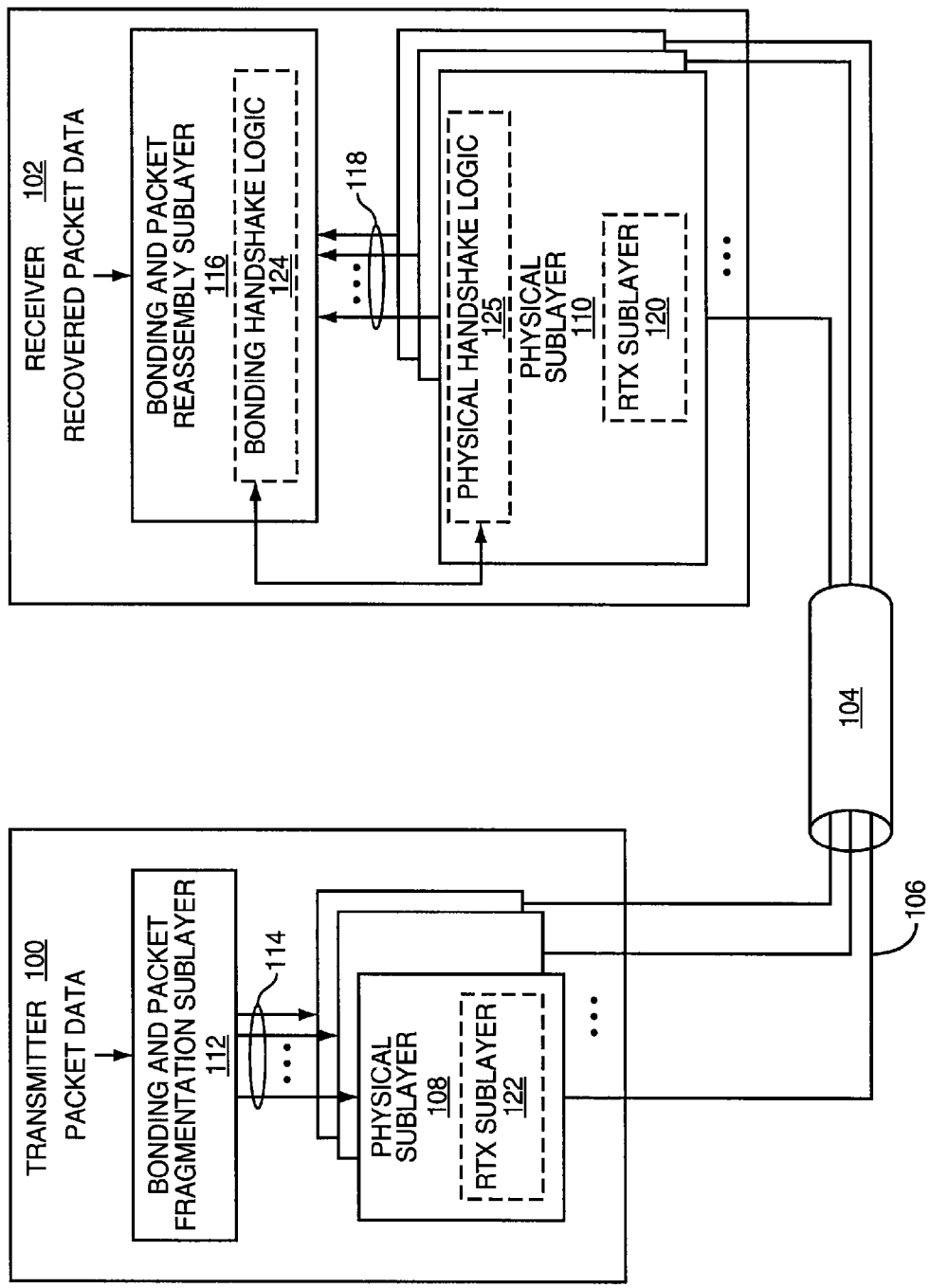
FIG. 1 is a block diagram of an embodiment of a transmitter and receiver that employ channel bonding and packet fragment retransmission.

FIG. 1 illustrates an embodiment of a transmitter 100 and receiver 102 coupled to each other via one or more cables 104. Each cable 104 has a plurality of communication lines 106 such as twisted copper pairs, fiber optic links or the like for coupling different physical sublayers 108 of the transmitter 100 to different physical sublayers 110 of the receiver 102. Packet data is transmitted from the transmitter 100 to the receiver 102 via the communication lines 106. On occasion, two or more of the communication lines 106 can be bonded together to form a single high bandwidth logical link when conditions permit. The transmitter 100 sends packet data to the receiver 102 by fragmenting the packet data and transmitting the packet fragments over the bonded communication lines 106. To this end, the transmitter 100 includes a packet fragmentation and bonding sublayer 112 that dissembles outgoing packet data into fragments and spreads the packet fragments over a plurality of the communication lines 106 using a bonding protocol (e.g. a round robin method). The term "packet fragment" as used herein means any subunit of a packet and can include fragments derived directly from Ethernet packets, e.g., in accordance with ITU-T (Telecommunication Standardization Sector of ITU) standard G.998.1 and G.998.2, fragments of Ethernet packets spread over several ATM cells or the like. The packet fragments are transferred in a particular sequence to the physical sublayers 108 assigned to the respective bonding lines 106. In an embodiment, the packet fragments are transferred to the physical sublayers 108 over a gamma interface 114. The packet fragments are then transmitted by the physical sublayers 108 to the receiver 102 over the bonded communication lines 106.

The receiver 102 similarly has a physical sublayer 110 allocated to each bonded communication line 106. The physical sublayers 110 of the receiver 102 recover packet fragments transmitted to the receiver 102 over the bonded communication lines 106. Recovered packet fragments are then passed to a bonding and packet reassembly sublayer 116 of the receiver 102 for further processing. In an embodiment, the different physical sublayers 110 and the bonding and packet reassembly sublayer 116 communicate over a gamma interface 118. Packet data is reassembled by the bonding and packet reassembly sublayer 116 from recovered packet fragments based on the order in which the packet fragments were generated by the transmitter 100 as indicated by sequence information embedded within each transmitted packet fragment.

The receiver 102 includes handshake logic 124, 125 for controlling when newly recovered packet fragments are transferred from each physical sublayer 110 to the bonding and packet reassembly sublayer 116. The handshake logic 124, 125 can be implemented in both the physical sublayers 110 and the bonding and packet reassembly sublayer 116 as shown in FIG. 1, in one of the sublayers 110/116 or elsewhere, e.g., in a separate device or control logic. In each case, recovered packet fragments remain stored in the physical sublayers 110 unless the handshake logic 124, 125 indicates one or more fragments can be transferred over the gamma interface 118 to the bonding and packet reassembly sublayer 116 for processing. In an embodiment, the next oldest fragment or fragments available at one of the physical sublayers 110 are transferred to the bonding and packet reassembly sublayer 116. The bonding handshake logic 124 then prevents that physical sublayer 110 from transferring additional fragments until the bonding and packet reassembly sublayer 116 confirms receipt of the previous fragment(s) and is ready for new fragment(s) from the physical sublayer 110. In another embodiment, the next oldest packet fragment(s) stored by each physical sublayer 110 are transmitted to the bonding and packet reassembly sublayer 116 as they become available. The bonding handshake logic 124 temporarily halts fragment transfers when the buffering capacity of the bonding and packet reassembly sublayer 116 falls below a predetermined level, preventing buffer overflows in the bonding and packet reassembly sublayer 116. In each embodiment, packet fragments will be missing from time-to-time because of data transmission errors.

In the event of a data transmission error, the receiver 102 requests retransmission of the affected packet fragment(s). To this end, each physical sublayer 110 at the receiver 102 includes a retransmission sublayer 120 for requesting retransmission of packet fragments that cannot be recovered because of a transmission error. Each physical sublayer 108 at the transmitter 100 similarly includes a retransmission sublayer 122 for responding to retransmission requests transmitted by the receiver 102. The physical sublayer 108 of the transmitter 100 that receives a retransmission request stops sending new packet fragments to the receiver 102 on the affected communication line 106. Each erroneous packet fragment requested by the receiver 102 is then retransmitted. The physical sublayers 108 of the transmitter 100 not affected by the retransmission request continue transmitting packet fragments as new fragments become available from the packet fragmentation and bonding sublayer 112.

As such, valid (i.e. non-erroneous) packet fragments arrive at the receiver 102 out of order from time-to-time. The handshake logic 124, 125 ensures that recovered packet fragments remain stored in the physical sublayers 110 until ready for processing by the bonding and packet reassembly sublayer 116. Particularly, the bonding handshake logic 124 prevents the physical sublayers 110 that have already transferred older fragments to the bonding and packet reassembly sublayer 116 from transferring fragments newer than the missing packet fragment until the missing fragment is either recovered or skipped. The physical handshake logic 125 permits each physical sublayer 110 to transfer its oldest recovered packet fragment or fragments to the bonding and packet reassembly sublayer 116 until the next oldest fragment to be processed is the one that is missing. This way, packet fragments are not processed out of order during packet reassembly. In addition, the likelihood of a buffer overflow in the bonding and packet reassembly sublayer 116 is reduced when the next oldest packet fragment to be processed by the bonding and packet reassembly sublayer 116 is not yet available because of a data transmission error. Packet fragments newer than the missing fragment remain stored in the physical sublayers 110 until the missing fragment is retransmitted without error or skipped, e.g., when a predetermined amount of time lapses before the transmission error is corrected.

In one embodiment, the physical sublayers 110 of the receiver 102 transfer recovered packet fragments to the bonding and packet reassembly sublayer 116 in order over the gamma interface 118 responsive to requests received from the bonding and packet reassembly sublayer 116 for additional packet fragments. The bonding and packet reassembly sublayer 116 is notified that no further packet fragments will be transferred across the gamma interface 118 when the next oldest fragment to be processed is corrupted because of a transmission error. Packet fragment transfers resume when the transmission error is corrected or the missing fragment is skipped. In either case, the handshake logic 124, 125 prevents buffer overflows in the bonding and packet reassembly sublayer 116 when packet fragment retransmission and channel bonding are employed by the receiver 102. That is, the physical handshake logic 125 enables each physical sublayer 110 to transfer its next oldest fragment or fragments to the bonding and packet reassembly sublayer 116. The buffering handshake logic 124 then prevents these physical sublayers 110 from transferring newer packet fragments until the oldest packet fragment yet to be processed is recovered without error or skipped. Packet fragment transfers over the gamma interface 118 then continue in order after the missing fragment is eventually recovered by one of the physical sublayers 110 and provided to the bonding and packet reassembly sublayer 116 or skipped. Details of the handshake logic 124, 125 will be discussed in more detail later.

Figure 2:
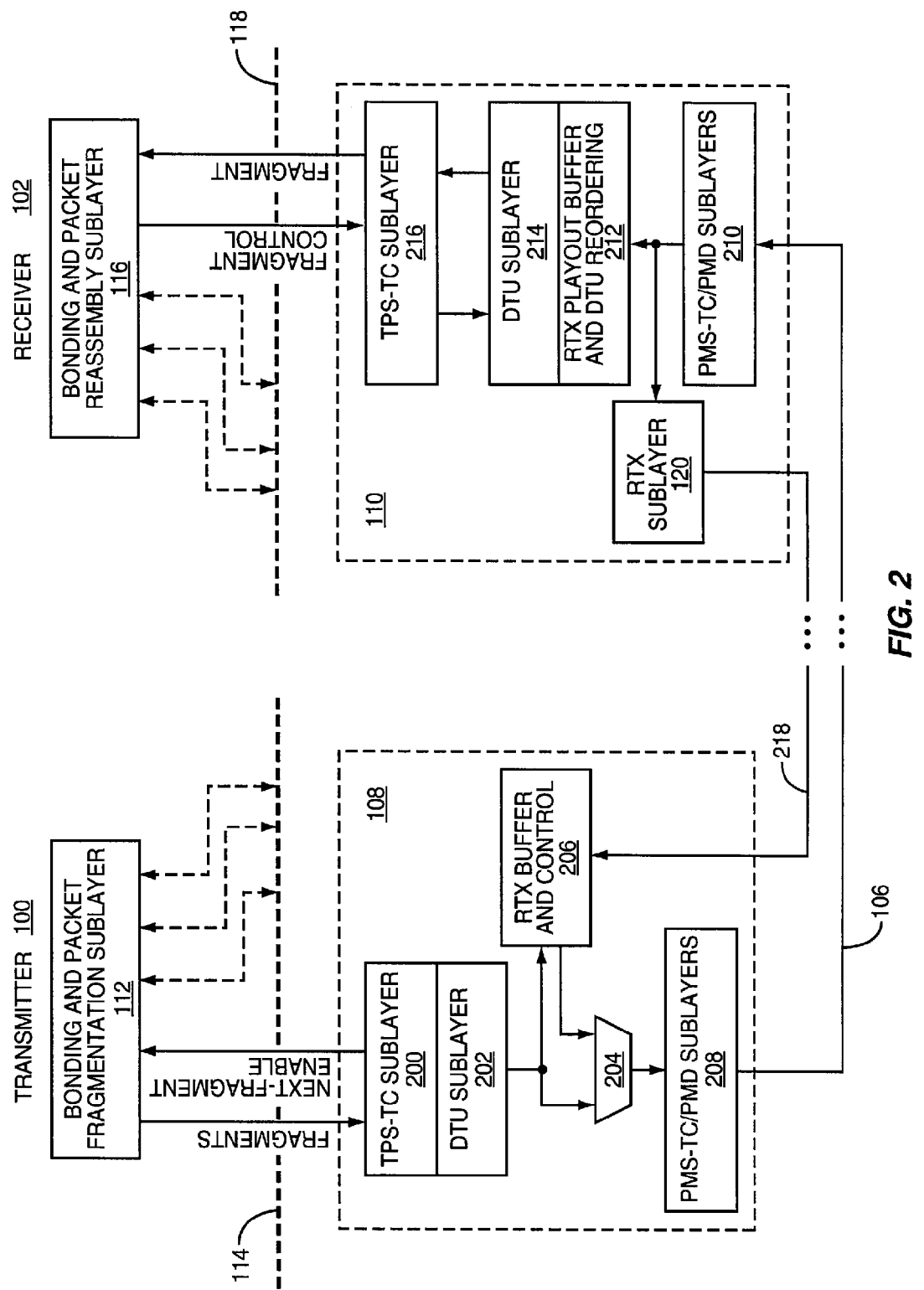
FIG. 2 is a block diagram of another embodiment of a transmitter and receiver that employ channel bonding and packet fragment retransmission.

FIG. 2 illustrates an embodiment of the transmitter 100 and receiver 102. Only a single instance of the transmitter and receiver physical sublayers 108, 110 is shown in FIG. 2 for ease of illustration and explanation only. However, the embodiments described herein can be readily extended to any number of physical sublayers 108, 110 for supporting bonding over any desired number of communication lines 106. When bonding is employed, the packet fragmentation and bonding sublayer 112 of the transmitter 100 disassembles packet data into fragments and passes the packet fragments to different ones of the physical sublayers 108 over the gamma interface 114 in a particular sequence which is based on the bonding method employed. In one embodiment, each packet fragment includes an identifier such as an SID for indicating the position of the fragments within the sequence. The receiver 102 uses sequence identifier information recovered from transmitted packet fragments to properly reassemble the packets when channel bonding is employed.

Each physical sublayer 108 of the transmitter 100 processes packet fragments received from the packet fragmentation and bonding sublayer 112 by constructing data transmission units (DTUs) from the packet fragments. DTUs represent the unit of data physically transmitted from the transmitter 100 to the receiver 102. The DTUs can be transmitted in the clear as unencoded data. Alternatively, the DTUs can be encoded, e.g., in accordance with a particular encapsulation protocol such as Ethernet, ATM (asynchronous transfer mode) or the like. Each physical sublayer 108 of the transmitter 100 includes a TPS-TC (Transport Protocol Specific Transmission Convergence) sublayer 200 for transforming the packet fragments into a "flat" data stream regardless of service protocol and data rate. A DTU sublayer 202 builds the basic DTUs that are to be transmitted by each physical sublayer 108.

In some embodiments, a single DTU corresponds to a single packet fragment. In other embodiments, a single packet fragment corresponds to several DTUs or vice-versa. In each case, DTUs are passed to a retransmission sublayer which includes a multiplexer 204 and retransmission buffer and control logic 206. When a DTU is first transmitted, the multiplexer 204 selects the output of the DTU sublayer 202 and passes the DTU to a PMD (Physical Media Dependent) and PMS-TC (Physical Media-Specific Transmission Convergence) sublayers 208. The retransmission sublayer can be located between the TPS-TC sublayer 200 and the PMD/PMS-TC sublayers 208, integrated into one or both sublayers 200, 208 or located above the TPS-TC sublayer 200. In each case, the PMD/PMS-TC sublayers 208 include a transceiver designed for the particular physical medium employed by the system. The PMD/PMS-TC sublayers 208 perform forward error correction (FEC), framing and modulation. The DTU is then transmitted over the corresponding communication line 106 by the PMD/PMS-TC sublayers 208. A copy of the DTU is stored in the retransmission buffer and control block 206 until safe reception is confirmed by the receiver 102.

Each physical sublayer 110 of the receiver 102 similarly includes a retransmission sublayer 120 for receiving transmitted DTUs and determining whether received DTUs have errors, e.g., by undoing the FEC, framing and modulation performed at the transmitter 100. Valid DTUs are stored in a buffer 212 and provided to a DTU processing sublayer 214 and TPS-TC sublayer 216 for recovering packet fragments from the DTUs, e.g., by unpacking the DTUs and reordering the DTUs based on SID or other identifier type. The DTU processing sublayer 214 and TPS-TC sublayer 216 transfer recovered packet fragments in proper order to the bonding and packet reassembly sublayer 116 over the gamma interface 118 for packet reassembly. The different physical sublayers 110 of the receiver 102 continue transferring recovered packet fragments over the gamma interface 118 until the next packet fragment in the sequence to be processed by the bonding and packet reassembly sublayer 116 cannot be recovered because of a transmission error on one or more of the bonded communication lines 106.

When a transmission error is detected, each physical sublayer 110 of the receiver 102 stores the recovered packet fragments in the corresponding buffer 212 without transferring the buffered packet fragments to the bonding and packet reassembly sublayer 116 until the transmission error is corrected or the missing packet fragment is skipped. In one embodiment, the missing packet fragment is skipped when a predetermined amount of time lapses before the fragment is received without error. Each physical sublayer 110 also includes a retransmission sublayer 120 for requesting retransmission of bad data units over the bonded communication lines 106 that cause transmission errors. The retransmission sublayer 120 can be located between the TPS-TC sublayer 216 and PMD/PMS-TC sublayers 210 or integrated into one or both of the sublayers 200, 210.

In the event of a transmission error, the receiver 102 requests DTU retransmission via an appropriate back channel 218. In response, the corresponding retransmission buffer and control block 206 at the transmitter 100 halts the transmission of new DTUs. The retransmission buffer and control block 206 then retrieves the requested DTU from memory and provides the DTU to the PMD/PMS-TC sublayers 208 for retransmission without having to regenerate the DTU. The DTU is once again transmitted to the receiver 102. No new DTUs are transmitted via this physical sublayer 108 until the DTU is safely received or the retransmission process times out. In either case, the receiver 102 notifies the transmitter 100 via the back channel 218 when regular transmission of new DTUs can resume on the physical sublayer 108.

The handshake logic 124, 125 implemented by the receiver 102 controls when newly recovered packet fragments are transferred from the different physical sublayers 110 to the bonding and packet reassembly sublayer 116 for further processing. This way, buffer overflow conditions are prevented in the bonding and packet reassembly sublayer 116 when channel bonding and packet fragment retransmission are employed at the same time. If a data transmission error occurs on one of the bonded communication lines 106, the retransmission sublayer 120 associated with the affected physical sublayer 110 sends a retransmission request to the corresponding physical sublayer 108 of the transmitter 102 to retransmit each affected DTU. The physical sublayers 110 of the receiver 102 not affected by the data transmission error are notified of the retransmission request. In response, all physical sublayers 110 stop transferring recovered packet fragments to the bonding and packet reassembly sublayer 116 when the corrupted DTU contains at least a part of the oldest packet fragment to be processed next by the bonding and packet reassembly sublayer 116. Thus, the bonding and packet reassembly layer 116 waits for the missing packet fragment without receiving further packet fragments until the missing fragment is either received without error or skipped, e.g., after a time out condition expires. No newer packet fragments are transferred across the gamma interface 118 to the bonding and packet reassembly sublayer 116, preventing buffer overflow at the bonding sublayer. Instead, packet fragments recovered from the unaffected lines 106 are stored in the physical sublayer buffers 212 even though no data transmission error has occurred on these lines 106.

If the missing packet fragment is retransmitted without error before a predetermined amount of time lapses, the fragment is transferred to the bonding and packet reassembly sublayer 116 by the physical sublayer 110 affected by the transmission error. The buffering handshake logic 124 then permits the remaining physical sublayers 110 to transfer their next oldest packet fragments to the bonding and packet reassembly sublayer 116 for processing. However, when too much time expires before the error can be corrected, the missing packet fragment is skipped. In response, the physical handshake logic 125 enables the physical sublayers 110 having the next oldest packet fragments to resume fragment transfers over the gamma interface 118 in proper sequence. Packet fragments are transferred in order to the bonding and packet reassembly sublayer 116 based on the identifier extracted from each fragment. The identifier, e.g., an SID or similar type of ID, indicates the order in which each fragment occurs in the corresponding packet. The bonding and packet reassembly sublayer 116 uses the sequence identifier information to properly reassemble transmitted data packets.

In one embodiment, the bonding and packet reassembly sublayer 116 requests packet fragments from the different physical sublayers 110 of the receiver 102 using the identifiers. In more detail, the different physical sublayers 110 recover identifiers from buffered packet fragments and send the recovered identifiers to the bonding and packet reassembly sublayer 116 before transferring actual fragment data over the gamma interface 118. The bonding and packet reassembly sublayer 116 determines which packet fragment should be processed next based on the identifiers provided by the physical sublayers 110. For example, the sixth packet fragment in the sequence is requested after the fifth fragment has been processed. The physical sublayer 110 that buffers the packet fragment having a matching identifier responds to the request by transferring the packet over the gamma interface 118, further reducing bonding buffer usage. The rate at which packet fragments are transferred across the gamma interface 118 to the bonding and packet reassembly sublayer 116 is much higher than the maximum bitrate of any of the physical communication lines 106. As such, recovered packet fragments are removed from the physical sublayer buffers 212 faster than new fragments enter once transfers resume over the gamma interface 118. Accordingly, the physical sublayer buffers 212 quickly return to a minimal delay state.

In an embodiment, each physical sublayer buffer 212 is used for retransmissions when an error occurs on the corresponding line 106 and fragment buffering when an error occurs on a different one of the lines 106. In one embodiment, each physical sublayer buffer 212 is sized to accommodate a maximum retransmission delay time. Thus, approximately the same amount of memory is allocated for both retransmissions when an error occurs on the corresponding line 106 and fragment buffering when an error occurs on a different one of the lines 106. The handshake logic 124, 125 implemented at the receiver 102 ensures that the buffer 212 of each physical sublayer 110 affected by a data transmission error is used for retransmission only, and thus no further buffer capacity is needed to accommodate the bonding protocol employed at the receiver 102. The physical sublayer buffers 212 unaffected by the transmission error have an amount of memory proportional to the line data rate and the time taken for the retransmission procedure on the affected line 106. If the time allocated for a retransmission expires before the error is corrected, the missing packet fragment is skipped and newer fragments are transferred to the bonding and packet reassembly sublayer 116 in sequence. Accordingly, the handshake logic 124, 125 ensures that the maximum amount of memory allocated to each communication link 106 in the same bonding group is the same regardless of which link 106 a transmission error occurs on.

Figure 3:
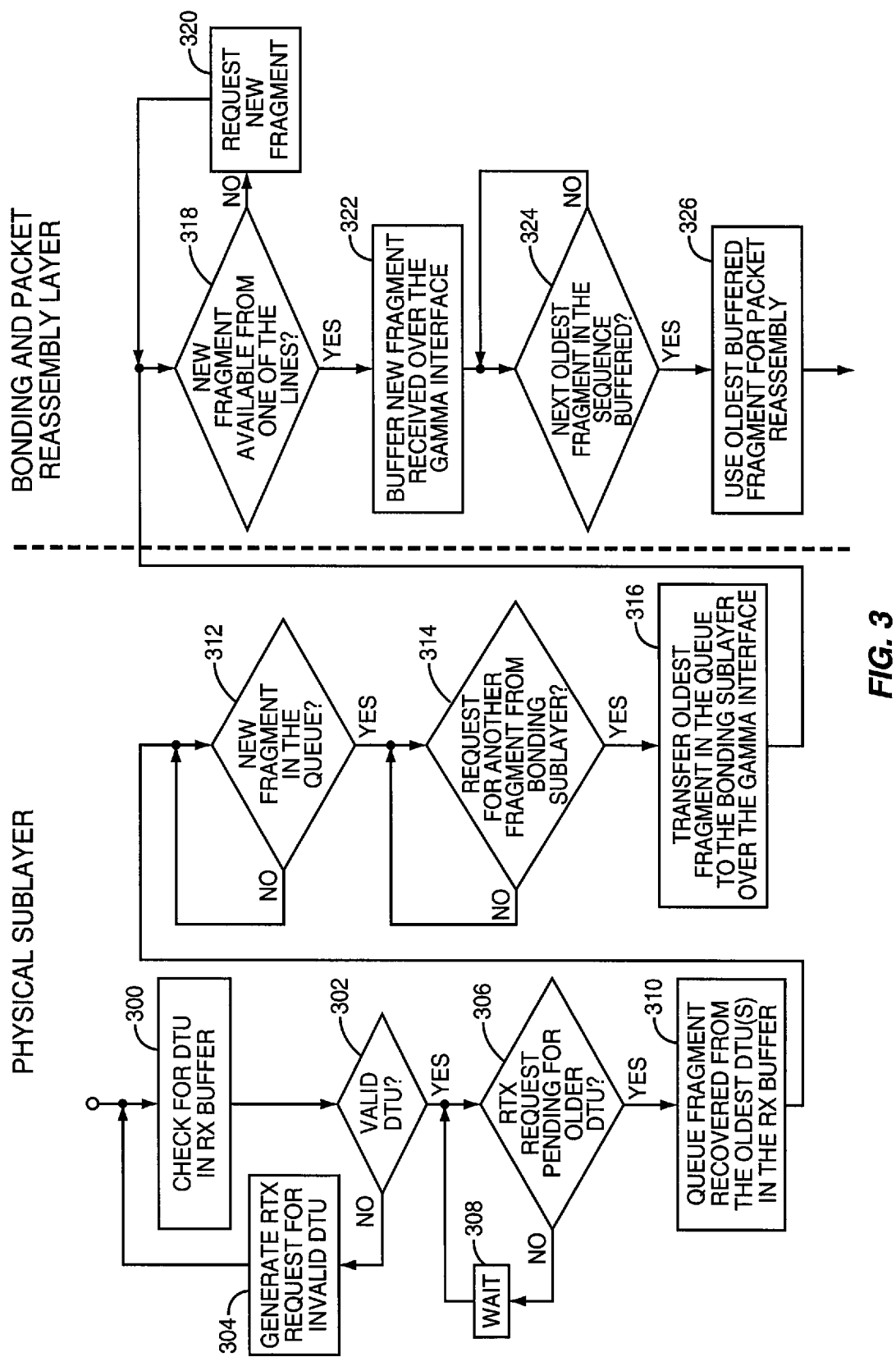
FIG. 3 is a flow diagram of an embodiment of a method for processing a sequence of packet fragments transmitted as data units over a plurality of bonded communication lines.

FIG. 3 illustrates one embodiment of a method carried out by the handshake logic 124, 125 of the receiver 102 for processing a sequence of packet fragments transmitted as DTUs over a bonded group of the communication lines 106. Each DTU sublayer 202 or retransmission sublayer 120 of the different physical sublayers 110 checks for a new DTU in the physical sublayer buffer 212 (Step 300). The PMD/PMS-TC sublayers 210 also determine whether the newly received DTU is valid or corrupt (Step 302). If corrupt, the retransmission sublayer 120 sends a retransmission request to the transmitter 100 (Step 304). The retransmission sublayer 120 also determines whether there is a retransmission request pending for an older DTU in the sequence, e.g., by comparing recovered SIDs or other identifiers (Step 306). If so, the physical sublayer 110 affected by the transmission error waits for the older DTU to be retransmitted (Step 308). The other physical sublayers 110 are notified of the pending retransmission request, and in response buffer recovered packet fragments newer than the missing fragment without transferring the buffered fragments to the bonding and packet reassembly sublayer 116.

In one embodiment, recovered packet fragments are transferred to the bonding and packet reassembly layer 116 until the packet fragment in the sequence with the oldest identifier yet to be processed by the bonding and packet reassembly sublayer 116 cannot be recovered because of a transmission error. Accordingly, each recovered packet fragment with a newer identifier than the packet fragment with the transmission error is buffered without being transferred to the bonding and packet reassembly sublayer 116 until the data transmission error is corrected or a predetermined amount of time lapses. If the data transmission error is corrected in sufficient time, the corresponding physical sublayer 110 recovers the packet fragment from one or more retransmitted DTUs transmitted without error. The newly recovered packet fragment is then transferred to the bonding and packet reassembly sublayer 116 before any buffered packet fragments with a newer identifier are transferred. This prevents buffer overflows in the bonding and packet reassembly sublayer 116 as previously described herein.

When the oldest missing DTU is received or skipped, the packet fragment recovered from the oldest valid DTU(s) is stored in the physical sublayer buffer 212 and queued for transmission over the gamma interface 118 (Step 310). The TPS-TC sublayer 216 monitors whether a new packet fragment has been stored in the buffer 212 (312) and whether the bonding and packet reassembly sublayer 116 has requested another packet fragment (Step 314). When both conditions are satisfied, the TPS-TC sublayer 216 transfers the oldest fragment in the buffer 212 to the bonding and packet reassembly sublayer 116 (316).

The bonding and packet reassembly sublayer 116 monitors the gamma interface 118 for new packet fragments from the different physical sublayers 110 (Step 318). The bonding and packet reassembly sublayer 116 also requests the next oldest packet fragment in the sequence for processing when the immediately preceding fragment has been processed (Step 320). The physical sublayer 110 having the next oldest packet fragment responds by transferring the fragment unless it is missing. When the next oldest fragment to be processed by the bonding and packet reassembly sublayer 116 is missing, no newer packet fragments are transferred over the gamma interface 118 until the oldest missing fragment is received or skipped (Steps 300-316). This way, buffer overflows do not occur in the bonding and packet reassembly sublayer 116. The bonding and packet reassembly sublayer 116 buffers new packet fragments transferred over the gamma interface 118 (322) and determines whether the next oldest fragment in the sequence to be processed is buffered (Step 324). If the next oldest fragment in the sequence to be processed is buffered or skipped, the oldest available fragment in the buffer is used for packet reassembly (Step 326).

Figure 4:
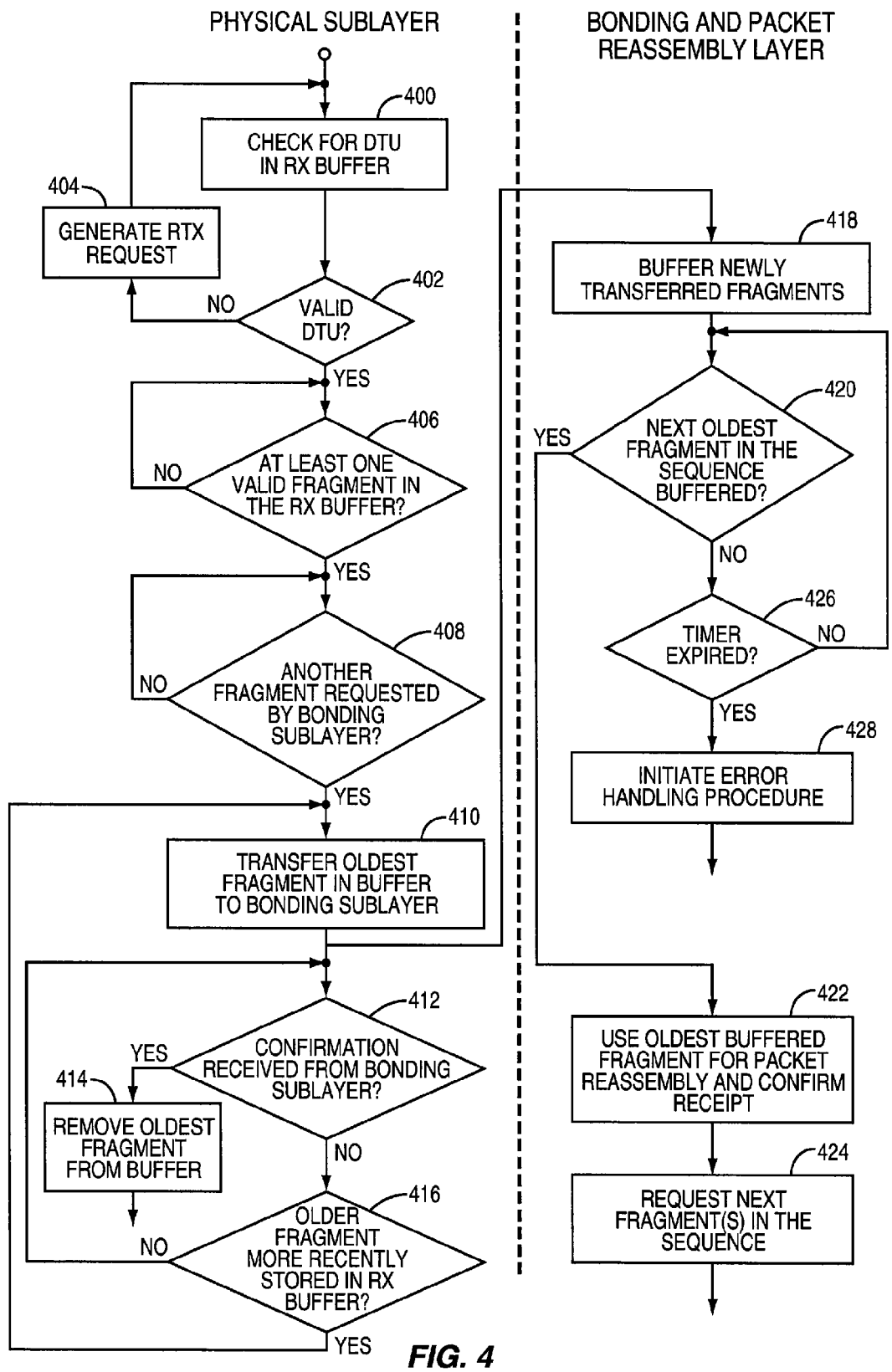
FIG. 4 is a flow diagram of another embodiment of a method for processing a sequence of packet fragments transmitted as data units over a plurality of bonded communication lines.

FIG. 4 illustrates another embodiment of a method carried out by the handshake logic 124, 125 of the receiver 102 for processing a sequence of packet fragments transmitted as DTUs over a bonded group of the communication lines 106. The method begins with each PMD/PMS-TC sublayer 210 checking for a new DTU in the respective physical sublayer buffers 212 (Step 400). The PMD/PMS-TC sublayers 210 also determine whether a newly received DTU is valid or corrupt (Step 402). If a DTU is corrupt, the corresponding retransmission sublayer 120 generates a retransmission request and sends the request to the transmitter 100 (Step 404). Alternatively, the bonding and packet reassembly sublayer 116 can generate retransmission requests. According to an embodiment, the bonding and packet reassembly sublayer 116 generates a retransmission request based on the identifier of the missing packet fragment. The bonding and packet reassembly sublayer 116 transfers the retransmission request to each of the physical sublayers 110 over the gamma interface 118. The physical sublayer 110 responsible for the missing fragment recognizes the identifier included in the retransmission request, and in response transmits the request to the transmitter 100 over the corresponding back channel 218. In either case, the buffering handshake logic 124 also notifies the other physical sublayers 110 of the receiver 102 to buffer recovered packet fragments newer than the missing fragment without transferring the buffered fragments to the bonding and packet reassembly sublayer 116.

If the received DTU has not been corrupted, the DTU is stored in the physical sublayer buffer 212. The DTU processing sublayer 214 recovers a packet fragment from the DTU or multiple DTUs. The DTU processing sublayer 214 and TPS-TC sublayer 216 determine whether a valid packet fragment is stored in the buffer 212 (Step 406). If so, the TPS-TC sublayer 216 determines whether the bonding and packet reassembly sublayer 116 has requested another packet fragment in the sequence (Step 408). When a new packet fragment request arrives over the gamma interface 118, the corresponding TPS-TC sublayer 216 transfers the oldest fragment in the physical sublayer buffer 212 to the bonding and packet reassembly sublayer 116 for processing (Step 410). The TPS-TC sublayer 216 waits for a confirmation from the bonding and packet reassembly sublayer 116 that the newly transferred packet fragment has been safely received (Step 412). The packet fragment is removed from the physical sublayer buffer 212 upon receipt of the confirmation (Step 414).

However, the physical sublayer 110 continues to monitor its buffer 212 for even older fragments until the bonding and packet reassembly sublayer 116 confirms receipt of the most recently transferred packet fragment (Step 416). This allows the physical sublayers 110 to replace packet fragments transferred to the bonding and packet reassembly sublayer 116 with even older fragments, e.g., in the event a transmission error occurs and is subsequently corrected via retransmission. If an older packet fragment is retransmitted and recovered without error before the bonding and packet reassembly sublayer 116 acknowledges receipt of the previously transferred fragment, the older packet fragment is transferred over the gamma interface 118 (Step 410). This allows the bonding and packet reassembly sublayer 116 to replace newer packet fragments transferred out of sequence with older fragments before the retransmission timeout period expires.

The bonding and packet reassembly sublayer 116 buffers the packet fragments received over the gamma interface 118 (Step 418) and determines whether the next oldest fragment to be processed has been buffered (Step 420). In an embodiment, the bonding and packet reassembly sublayer 116 compares SIDs or other identifiers provided with the packet fragments to determine the sequence of each fragment in a packet. If the next fragment in the sequence is available, the fragment is used to aid in packet reassembly and receipt of the fragment is confirmed to the corresponding physical sublayer 110 (422). The bonding and packet reassembly sublayer 116 then requests the next packet fragment(s) in the sequence from the physical sublayers 110 (Step 424).

However, if the next oldest fragment in the sequence is not buffered by the bonding and packet reassembly sublayer 116, e.g., because of a transmission error, the bonding and packet reassembly sublayer 116 determines when to skip the missing packet fragment and continue with reassembly of the packet. In one embodiment, the bonding and packet reassembly sublayer 116 determines whether a predetermined amount of time has lapsed before the packet fragment is retransmitted without error (Step 426). In another embodiment, the missing packet fragment is skipped if a predetermined buffer capacity is exceeded by the packet fragments currently stored by the bonding and packet reassembly sublayer 116. In each case, the bonding and packet reassembly sublayer 116 controls when to skip missing packet fragments according to this embodiment. An error handling procedure is initiated when a packet fragment is skipped (Step 428). In an embodiment, the next fragment in the sequence is requested from the different physical layers 110, e.g., based on SID or other identifier. Other types of error handling routines can also be implemented. In each case, the bonding and packet reassembly sublayer 116 continues the packet reassembly process with the packet fragments that are available.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of processing a sequence of packet fragments transmitted as data units over a plurality of bonded communication lines, the method comprising: recovering different ones of the packet fragments from the data units that are received without error over the plurality of bonded communication lines which form a single logical link; transferring the recovered packet fragments to a bonding sublayer for packet reassembly until the next packet fragment in the sequence to be processed by the bonding sublayer cannot be recovered because of a transmission error on one or more of the bonded communication lines, wherein handshake logic included in or associated with the bonding sublayer controls the transfer of the recovered packet fragments from one or more physical sublayers to the bonding sublayer; buffering, under control of the handshake logic, the recovered packet fragments after the transmission error is detected without transferring the buffered packet fragments to the bonding sublayer unless the transmission error is corrected or the packet fragment having the transmission error is skipped; and requesting retransmission of one or more erroneous data units over the one or more bonded communication lines that caused the transmission error.

2. The method of claim 1, comprising transferring the recovered packet fragments to the bonding sublayer in order based on an identifier recovered from each packet fragment, the identifier indicating the position of the recovered packet fragments within the sequence.

3. The method of claim 1, comprising sending identifiers recovered from the packet fragments to the bonding sublayer before the recovered packet fragments are transferred to the bonding sublayer so that the bonding sublayer can determine which packet fragment should be processed next based on the recovered identifiers.

4. The method of claim 3, comprising transferring the recovered packet fragment to the bonding sublayer having the identifier that matches an identifier included in a request received from the bonding sublayer for another packet fragment.

5. The method of claim 2, comprising transferring the recovered packet fragments to the bonding sublayer until the packet fragment in the sequence with the oldest identifier yet to be processed by the bonding sublayer cannot be recovered because of the transmission error.

6. The method of claim 5, comprising buffering each recovered packet fragment with a newer identifier than the packet fragment with the transmission error without transferring the buffered packet fragments to the bonding sublayer until the data transmission error is corrected or a predetermined amount of time lapses.

7. The method of claim 5, comprising:
recovering the packet fragment in the sequence with the oldest identifier yet to be processed by the bonding sublayer from one or more retransmitted data units without error; and
transferring the packet fragment recovered from the one or more retransmitted data units to the bonding sublayer before any of the buffered packet fragments with a newer identifier are transferred to the bonding sublayer.

8. The method of claim 1, comprising:
transferring the recovered packet fragments to the bonding sublayer in order before the transmission error is detected responsive to requests received from the bonding sublayer for additional packet fragments; and
indicating to the bonding sublayer that no further packet fragments will be transferred to the bonding sublayer until the transmission error is corrected or a predetermined amount of time lapses.

9. A physical line receiver coupled to at least one of a plurality of bonded communication lines over which a sequence of packet fragments are transmitted as data units, the physical line receiver comprising at least one physical sublayer configured to: transfer packet fragments recovered from different ones of the data units received by the physical line receiver to a bonding sublayer for packet reassembly until the physical line receiver is instructed to stop transferring packet fragments because of a transmission error on one or more of the bonded communication lines coupled to a different physical line receiver, the plurality of bonded communication lines forming a single logical link; and buffer the recovered packet fragments without transferring the buffered packet fragments to the bonding sublayer unless instructed to resume transferring packet fragments to the bonding sublayer; and the physical line receiver further comprising handshake logic configured to control the transfer of the recovered packet fragments from the at least one physical sublayer to the bonding sublayer and to control the buffering of the recovered packet fragments.

10. The physical line receiver of claim 9, further comprising a retransmission sublayer configured to issue a retransmission request when a transmission error is detected on the at least one bonded communication line coupled to the physical line receiver.

11. The physical line receiver of claim 10, further comprising a single buffer configured for retransmission buffering when a transmission error is detected on the at least one bonded communication line coupled to the physical line receiver and packet fragment buffering when a transmission error occurs on a bonded communication line coupled to a different physical line receiver.

12. The receiver of claim 9, wherein the at least one physical sublayer is configured to transfer the recovered packet fragments to the bonding sublayer in order based on an identifier recovered from each packet fragment, the identifier indicating the position of the recovered packet fragments within the sequence.

13. The receiver of claim 9, wherein the at least one physical sublayer is configured to send identifiers recovered from the packet fragments to the bonding sublayer before the recovered packet fragments are transferred to the bonding sublayer so that the bonding sublayer can determine which packet fragment should be processed next based on the recovered identifiers.

14. A method of reassembling transmitted data packets, comprising: receiving packet fragments recovered from data units transmitted over a plurality of bonded communication lines without error, the plurality of bonded communication lines forming a single logical link; reassembling a data packet from the received packet fragments based on a sequence in which the packet fragments are transmitted over the bonded communication lines, wherein the data packet is reassembled by a bonding sublayer and handshake logic included in or associated with the bonding sublayer controls the transfer of the received packet fragments from one or more physical sublayers to the bonding sublayer for reassembly; determining whether a packet fragment in the sequence is missing; and determining whether to stop requesting new packet fragments when a packet fragment in the sequence is missing or skip the missing packet fragment and continue requesting new packet fragments.

15. The method of claim 14, comprising suspending requests for new packet fragments until the missing packet fragment is received, a predetermined amount of buffer capacity is exceeded by storing the received packet fragments or a predetermined amount of time lapses.

16. The method of claim 15, comprising shortening the predetermined amount of time when consecutive data transmission errors occur over the bonded communication lines.

17. The method of claim 14, comprising generating a retransmission request for the missing packet fragment configured to be transmitted over the bonded communication line that initially transmitted the missing packet fragment.

18. A receiver, comprising: a buffer configured to store received packet fragments recovered from data units transmitted over a plurality of bonded communication lines without error, the plurality of bonded communication lines forming a single logical link; a bonding sublayer configured to: reassemble a data packet from the received packet fragments based on a sequence in which the packet fragments are transmitted over the bonded communication lines; determine whether a packet fragment in the sequence is missing; and determine whether to stop requesting new packet fragments when a packet fragment in the sequence is missing or skip the missing packet fragment and continue requesting new packet fragments; and handshake logic included in or associated with the bonding sublayer and configured to control the transfer of the received packet fragments from one or more physical sublayers to the bonding sublayer for reassembly.

19. The receiver of claim 18, wherein the bonding sublayer is configured to suspend requests for new packet fragments until the missing packet fragment is received, a predetermined capacity of the buffer is exceeded by the received packet fragments or a predetermined amount of time lapses.

20. The receiver of claim 19, wherein the bonding sublayer is configured to continue with reassembly of the data packet using the next oldest recovered packet fragment in the sequence when the missing packet fragment is skipped.

21. The receiver of claim 19, wherein the predetermined amount of time is shortened when consecutive data transmission errors occur over the bonded communication lines.

22. The receiver of claim 18, wherein the bonding sublayer is configured to generate a retransmission request for the missing packet fragment configured to be transmitted over the bonded communication line that initially transmitted the missing packet fragment.

23. A receiver, comprising: a buffer configured to store recovered packet fragments transmitted in a particular sequence over a plurality of bonded communication lines which form a single logical link; a bonding sublayer configured to reassemble a data packet from the packet fragments stored in the buffer based on the sequence in which the packet fragments are transmitted over the bonded communication lines; plurality of physical sublayers configured to: recover the packet fragments from data units received without error from the bonded communication lines; transfer the recovered packet fragments to the bonding sublayer until the next packet fragment in the sequence to be processed by the bonding sublayer cannot be recovered because of a transmission error; and prevent the recovered packet fragments from being transferred to the bonding sublayer responsive to the transmission error being detected unless the transmission error is corrected or the packet fragment having the transmission error is skipped; and handshake logic included in or associated with the bonding sublayer and configured to control the transfer of the recovered packet fragments from the plurality of physical sublayers to the bonding sublayer for reassembly.

24. The receiver of claim 23, wherein each physical sublayer comprises a retransmission sublayer configured to request retransmission of one or more erroneous data units over the bonded communication line that caused the transmission error.

25. The receiver of claim 23, wherein the bonding sublayer is configured to stop requesting new packet fragments from the physical sublayers when a packet fragment in the sequence is missing or skip the missing packet fragment and continue requesting new packet fragments from the physical sublayers.

* * * * *